United States Patent [19]
Dillman

[11] Patent Number: 5,130,078
[45] Date of Patent: Jul. 14, 1992

[54] REACTIVITY CONTROL SYSTEM AND METHOD

[75] Inventor: Charles W. Dillman, Morgan Hill, Calif.

[73] Assignee: General Electric Company, San Jose, Calif.

[21] Appl. No.: 667,797

[22] Filed: Mar. 11, 1991

Related U.S. Application Data

[63] Continuation-in-part of Ser. No. 553,073, Jul. 10, 1990.

[51] Int. Cl.$^5$ ................................................ G21C 7/22
[52] U.S. Cl. ..................... 376/219; 376/328; 376/282
[58] Field of Search ............... 376/219, 210, 220, 327, 376/328, 282, 207, 277, 283; 976/DIG. 117, DIG. 130, DIG. 148, DIG. 146, DIG. 139

[56] References Cited

U.S. PATENT DOCUMENTS 4,643,871 2/1987 Fajeau .................................. 376/282
4,753,771 6/1988 Conway et al. ...................... 376/282

OTHER PUBLICATIONS

Wilkins et al., *Advanced BWR: Design Improvements Build on Proven Technology*, Nuclear Engineering International, reprint Jun. 1986, pp. 1-7 and drawing entitled "The World's Reactors No. 89".
T. Baumeister, *Standard Handbook for Mechanical Engineers*, 1967, Title and copyright pages, and pp. 14-16 through 14-19.

*Primary Examiner*—Brooks H. Hunt
*Assistant Examiner*—Frederick H. Voss
*Attorney, Agent, or Firm*—Robert R. Schroeder

[57] ABSTRACT

A method and system for controlling nuclear reactivity in a nuclear reactor are disclosed. The method includes maintaining a nuclear position solution at an initial poison pressure less than the steam pressure within the reactor vessel. The method further includes channeling a pressurizing fluid into the holding tank for pressurizing the poison solution to a pressure greater than the initial pressure thereof, and draining by gravity the poison solution from the holding tank and into the reactor vessel for mixing with the water to reduce reactivity in the core.

The system includes the holding tank, apparatus for channeling the pressurizing fluid from the reactor vessel to the holding tank, apparatus for channeling the poison solution from the holding tank by gravity into the reactor vessel, and a controller for opening a normally closed pressurizing valve and a normally closed drain valve to allow flow of the pressurizing fluid to, and the drained poison solution from, the holding tank through the respective channeling apparatus.

17 Claims, 3 Drawing Sheets

5,130,078

REACTIVITY CONTROL SYSTEM AND METHOD

CROSS REFERENCE TO RELATED APPLICATION

This is a continuation-in-part of application Ser. No. 07/553,073, filed 10 Jul. 1990.

TECHNICAL FIELD

The present invention relates generally to a boiling water reactor (BWR), and, more specifically, to a system for controlling nuclear reactivity therein.

BACKGROUND ART

A conventional boiling water reactor includes a pressure vessel containing a reactor core and water, the core being effective for boiling the water for generating steam at a relatively high pressure. The steam is conventionally channeled to a conventional steam turbine for extracting energy therefrom and for driving, for example, a conventional electrical generator for generating power for a utility grid. The nuclear reactions, or reactivity, in the reactor core are conventionally controlled by conventional control rods. The control rods may be selectively inserted into the reactor core to decrease reactivity and to shut down the reactor core.

The reactor also typically includes an additional reactivity control system as a secondary, or backup reactivity control system in the event the primary system fails to achieve shutdown. In one exemplary alternate reactivity control system, relatively large holding tanks of conventional nuclear poison, such as boron-containing-water solutions, are provided adjacent to the reactor in the containment building. When activated, conventional positive displacement pumps inject the nuclear poison solution into the reactor vessel wherein it is mixed with the recirculating water therein to shut down the reactor core. The pump must be capable of generating sufficient flow rates and relatively high pressures of about 1,500 psi (10.3 MPa) for promptly channeling the nuclear poison into the reactor vessel which is maintained at a pressure of about 1,200 psi (8.3 MPa), for example. A conventional explosive valve is provided between the pump and the reactor vessel and is normally closed. Once the pump establishes an adequate pressure greater than that in the reactor vessel, the explosive valve is conventionally opened to allow the nuclear poison solution to quickly enter the reactor vessel.

Concepts also exist for obtaining a passive system without the use of pumps for effectively providing the nuclear poison to the reactor vessel. In one concept, the relatively large accumulator filled with the nuclear poison solution is pressurized by a gas to an overpressure greater than that within the reactor vessel. When required, a conventional explosive valve is opened to release the nuclear poison from the accumulator and into the reactor vessel. However, maintaining a large high pressure accumulator within the containment building poses a concern since adequate safety provisions must be provided.

OBJECTS OF THE INVENTION

Accordingly, one object of the present invention is to provide a new and improved reactivity control system.

Another object of the present invention is to provide a passive reactivity control system.

Another object of the present invention is to provide a reactivity control system having a nuclear poison holding tank which may be maintained at atmospheric pressure prior to being activated for discharging the nuclear poison solution therein into the reactor vessel.

DISCLOSURE OF INVENTION

A method and system for controlling nuclear reactivity in a nuclear reactor are disclosed. The method includes maintaining a nuclear poison solution at an initial poison pressure less than the steam pressure within the reactor vessel. The method further includes channeling a pressurizing fluid into the holding tank for pressurizing the poison solution to a pressure greater than the initial pressure thereof, and draining by gravity the poison solution from the holding tank and into the reactor vessel for mixing with the water to reduce reactivity in the core.

The system includes the holding tank, means for channeling the pressurizing fluid from the reactor vessel to the holding tank, means for channeling the poison solution from the holding tank by gravity into the reactor vessel, and means for opening a normally closed pressurizing valve and a normally closed drain valve to allow flow of the pressurizing fluid to, and the drained poison solution from, the holding tank through the respective channeling means.

BRIEF DESCRIPTION OF DRAWINGS

The novel features believed characteristic of the invention are set forth and differentiated in the claims. The invention, in accordance with preferred and exemplary embodiments, together with further objects and advantages thereof, is more particularly described in the following detailed description taken in conjunction with the accompanying drawing in which:

MODE(S) FOR CARRYING OUT THE INVENTION

Figure 1:
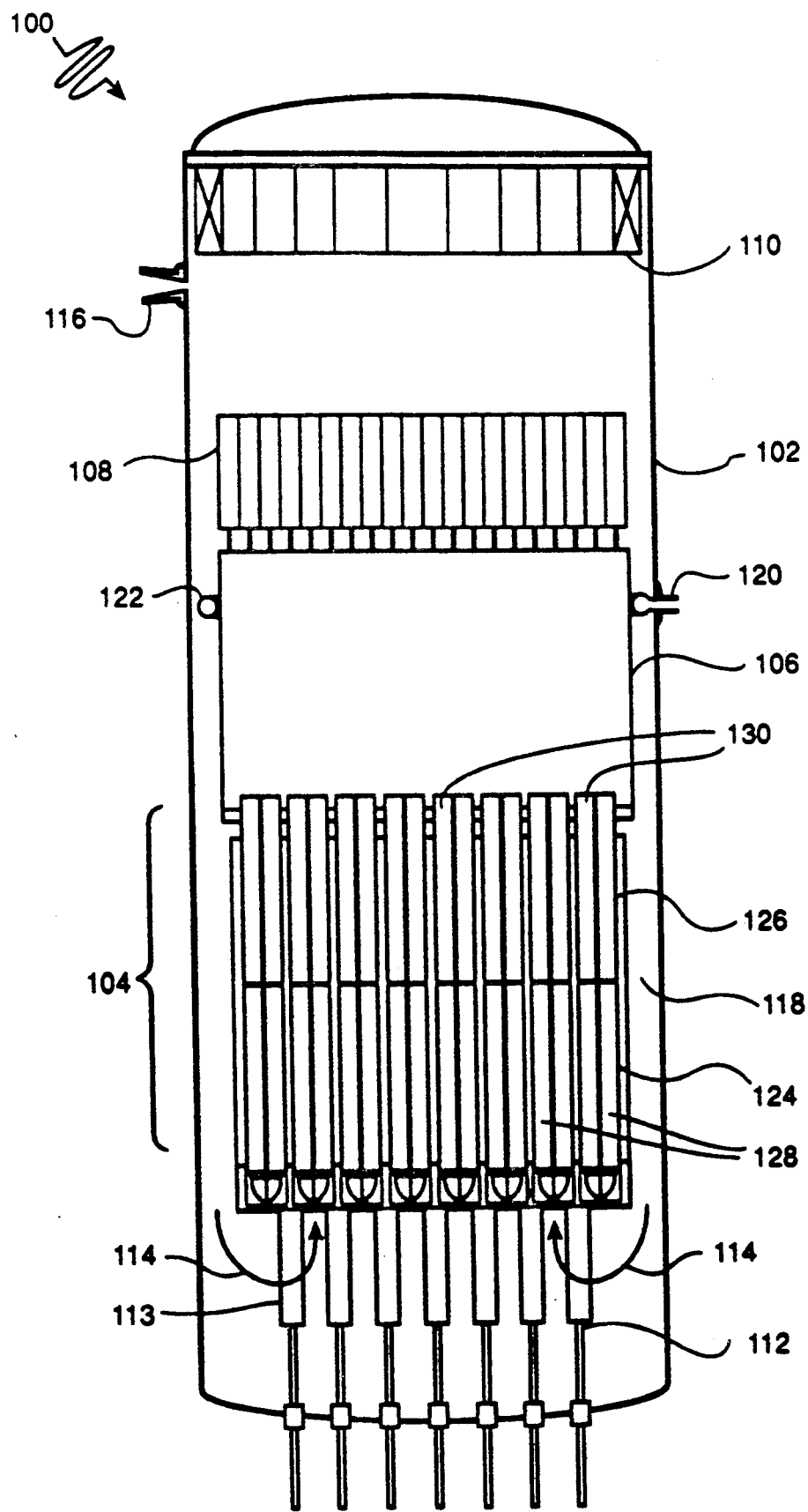
FIG. 1 is a schematic elevation sectional view of an exemplary reactor having a reactivity control system in accordance with one embodiment of the present invention.

Illustrated in FIG. 1 is an exemplary natural circulation boiling water nuclear reactor 100 comprising a pressure vessel 102, a nuclear core 104, a chimney 106, a steam separator 108, and a steam dryer 110. Control rod drive housings 112 extend through the bottom of the vessel 102 and support control rod guide tubes 113. The control rod guide tubes 113 extend to the bottom of the core 104 so that conventional control blades therein can be inserted into and retracted from the core 104 to control its power output.

Water flows, as indicated by arrows 114, into the core 104 from below. This subcooled water is boiled within the core 104 to yield a water/steam mixture which rises through the chimney 106. The steam separator 108 helps separate steam from water, and the released steam exits through a steam exit 116 near the top of the vessel 102. Before exiting, any remaining water entrained in the steam is removed by the dryer 110. The separated water is returned down a peripheral downcomer 118 in part by the force of the driving steam head provided by the chimney 106, or by gravity due to the difference in water density therebetween. The feedwater enters vessel 102 through a feedwater inlet nozzle 120 and feedwater sparger 122 to replenish and help cool the recirculating water in the downcomer 118.

The core 104 comprises a lower fuel matrix 124 and an upper fuel matrix 126. The upper fuel matrix 126 is filled with upwardly oriented fuel bundles 130, and the lower fuel matrix 124 is filled with downwardly oriented fuel bundles 128.

Figure 2:
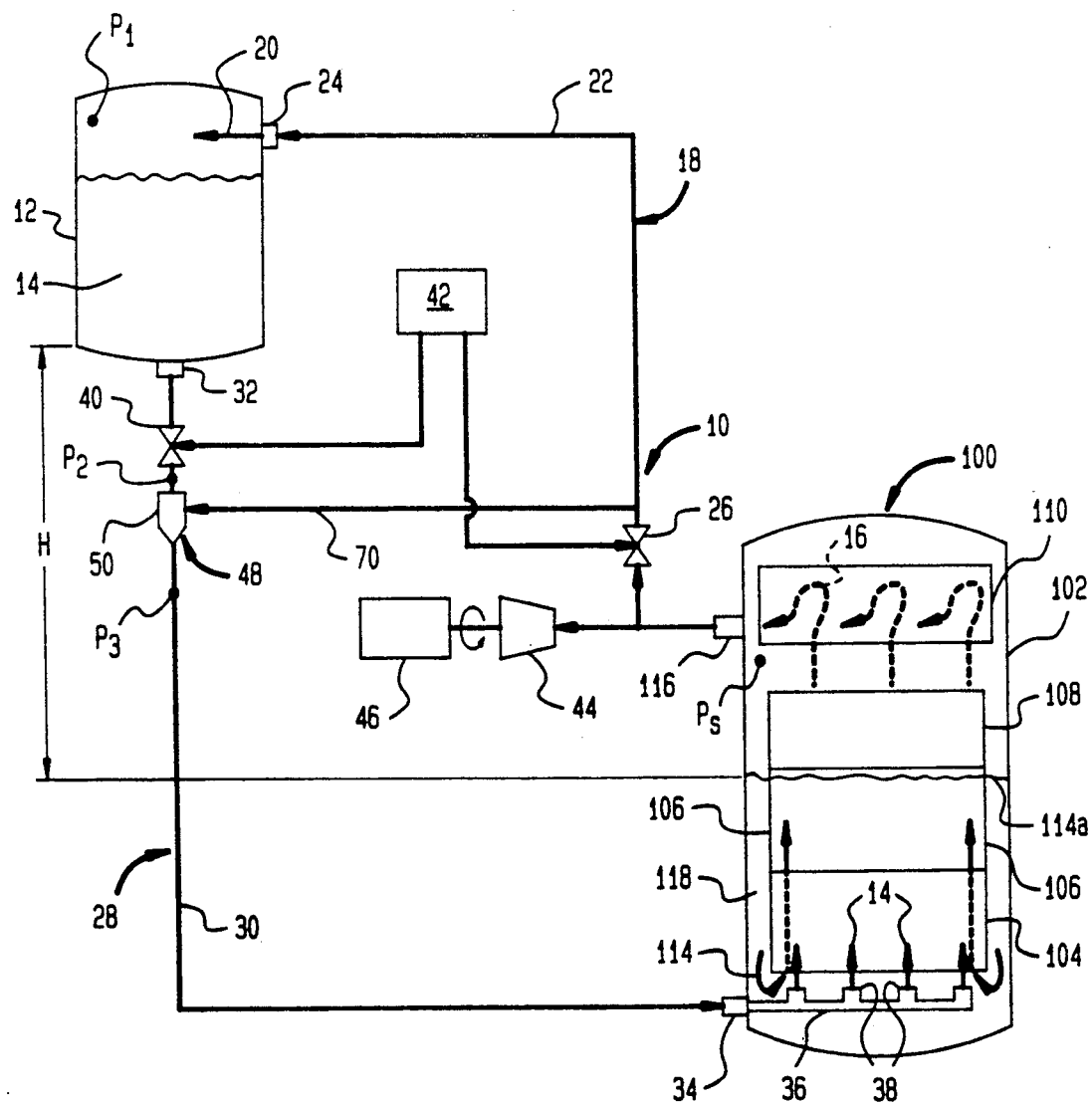
FIG. 2 is a schematic representation of the reactor illustrated in FIG. 1 including further components of the reactivity control system.

Illustrated schematically in FIG. 2 is a reactivity control system 10 in accordance with one embodiment of the present invention. The system 10 includes a holding tank 12 containing a conventional nuclear poison solution 14 which may, for example, contain boron such as sodium pentaborate or sodium tetraborate in a water solution. The nuclear poison 14 in accordance with a preferred embodiment of the present invention is maintained at an initial, or first, poison pressure $P_1$ which is less than the pressure contained in the pressure vessel 102, e.g., the pressure $P_s$ of steam 16 generated in the vessel 102 and discharged through the steam exit 116. In the preferred embodiment of the present invention, the initial poison pressure $P_1$ is simply atmospheric pressure, and represents the pressure within the holding tank 12 in the empty space above the nuclear poison 14.

The system 10 further includes means 18 for channeling a pressurizing fluid 20 from the reactor vessel 102 to the holding tank 12 for pressurizing the poison solution 14 to a second pressure $P_2$ greater than the initial pressure $P_1$. In the embodiment illustrated in FIG. 2, the pressurizing fluid 20 is a portion of the steam 16 from the reactor vessel 102, and the channeling means 18 include a steam conduit 22 disposed in flow communication between the holding tank 12 at an inlet 24 at its top and the reactor vessel 102 at the steam outlet 116. The channeling means 18 also include a conventional explosive steam, or pressurizing, valve 26 disposed in series flow communication in the steam conduit 22, which valve 26 is normally closed for preventing flow of the steam 16 through the conduit 22 to the holding tank 12.

Means 28 are provided for channeling the poison solution 14 from the holding tank 12 by gravity into the reactor vessel 102 for mixing with the water 114 to reduce reactivity in the core 104. The channeling means 28 in the embodiment illustrated in FIG. 2 includes a drain conduit 30 disposed in flow communication between the holding tank at an outlet 32 at its bottom and the reactor vessel 102 at a poison inlet 34 at its bottom.

The poison inlet 34 is preferably disposed at the bottom of the reactor vessel 102 below the core 104 and below the level 114a of the water 114 therein. A manifold 36 is disposed under the core 104 in the vessel 102 and in flow communication with the poison inlet 34, and includes a plurality of outlets 38 for discharging the poison solution 14 below the core 104 for mixing with the water 114 for reducing nuclear reactions in the core 104. The channeling means 28 also include a conventional explosive drain valve 40 disposed in series flow communication in the drain conduit 30, which valve 40 is normally closed for preventing flow of the poison solution 14 drained from the holding tank to the reactor vessel 102.

Means 42 in the form of a conventional electrical controller are provided for selectively opening the steam valve 26 and the drain valve 40 to allow flow of the steam 16 through the steam conduit 22 to the holding tank 12, and flow of the nuclear poison 14 from the holding tank through the drain conduit 30 to the vessel 102. The controller 42 is suitably electrically connected to both of the explosive valves 26 and 40 for opening these valves substantially instantaneously and substantially simultaneously upon command when shutdown of the reactor core 104 is desired.

In the preferred embodiment of the present invention illustrated in FIG. 2, the holding tank 12 is initially maintained at atmospheric pressure which, therefore, improves safety of operation. When it is desired to shutdown the core 104 using the reactivity control system 10, the controller 42 signals both valves 26 and 40 to explosively open which provides a portion of the steam 16 from the vessel 102 into the holding tank 12. The steam 16 is at a pressure of about 1,200 psi (8.3 MPa) which is used to pressurize the holding tank 12. The pressurizing fluid 20 may simply be obtained by joining the steam conduit 22 to the steam exit 116 for obtaining a portion of the steam 16, the remaining portion of which is conventionally channeled to a conventional steam turbine 44 which, in this exemplary embodiment, powers a conventional electrical generator 46.

Since the pressurizing fluid 20 can only pressurize the holding tank 12 to the pressure of the steam 16 in the vessel 102, additional means are required for obtaining flow of the nuclear poison 14 from the tank 12 and into the vessel 102. In a preferred embodiment of the present invention, the tank outlet 32 is preferably vertically positioned at a distance H above the water level 114a the vessel 102 to ensure that gravity is effective for draining the poison solution 14 from the tank 12 and into the vessel 102. All that is required, however, is that the pressure of the poison solution 14 at the tank outlet 32 is greater than the pressure of the water 114 at the poison inlet 34 to the vessel 102 due to the respective pressure heads thereof taking in consideration the relative height therebetween and the respective densities of the poison solution 14 and the water 114.

Accordingly, the reactivity control system 10 is effective for practicing an improved method of controlling nuclear reactivity of the core 104 which includes the step of maintaining the poison solution 14 in the holding tank 12 at the initial, preferably atmospheric, poison pressure $P_1$ which is less than the steam pressure $P_s$, and channeling the pressurizing fluid 20 into the tank 12 for pressurizing the solution 14 to a second poison pressure $P_2$ which is greater than the initial poison pressure $P_1$. The method also includes draining by gravity the solution 14 from the tank 12 and channeling the drained solution 14 into the vessel 102 for mixing with the water 114 to reduce, or substantially stop, reactivity in the core 104.

In the preferred embodiment of the present invention, in order to increase the flow rate of the poison 14 channeled through the drain conduit 30 to the vessel 102, the method further includes a step of pressurizing the drained poison solution 14 to a third poison pressure $P_3$ which is greater than the steam pressure $P_s$, which pressurized drained poison solution being channeled into the vessel 102 through the drain conduit 30 for mixing with the water 114. Means 48 for pressurizing the drained poison solution 14 to the third poison pressure $P_3$ are provided, and, in a preferred embodiment of the present invention, include a conventional gas-jet pump 50 being disposed in flow communication in the drain conduit 30 for increasing the pressure of the solution 14 being channeled therethrough.

Figure 3:
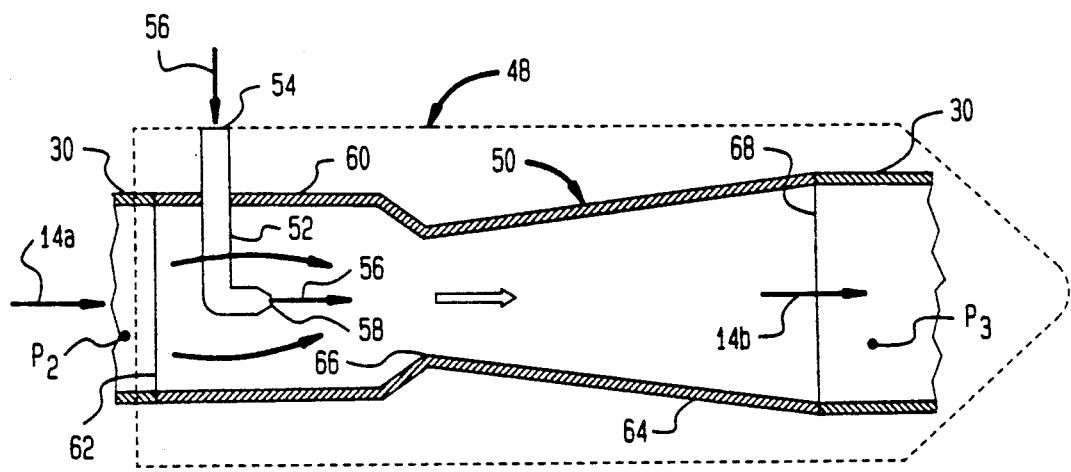
FIG. 3 is an enlarged longitudinal sectional view of a gas-jet pump used in the reactivity control system illustrated in FIG. 2.

The pump 50 is illustrated in more particularity in FIG. 3 and includes a nozzle 52 having an inlet 54 for receiving a pressurized gas 56, and an outlet 58 for discharging the gas 56 as a jet having kinetic energy. A tubular mixer 60 having an annular inlet 62 is provided for receiving the drained poison solution, designated 14a, from the valve 40 through the conduit 30. The nozzle 52 extends through the side wall of the mixture 60 with the nozzle outlet 58 being disposed centrally inside the mixer 60 for discharging the gas 56 for mixing with the drained poison solution 14a in the mixer 60. A conventional tubular diffuser 64 extends downstream and in flow communication with the mixer 60 and diverges in the downstream direction from a minimum flow area at a throat 66, defined at the junction with the mixer 60, to a maximum flow area at an outlet 68 of the diffuser 64. The diffuser 64 is effective for diffusing the mixed gas 56 and the drained poison solution 14a received from the mixer 60 for decreasing the velocity thereof and increasing the static pressure thereof for forming a pressurized drained poison solution, designated 14b, which is discharged from the outlet 68.

The mixer inlet 62 is disposed in flow communication with the drain valve 40 through the drain conduit 30 for receiving the drained poison solution 14a therefrom, and the diffuser outlet 68 is disposed in flow communication with the vessel 102 through the drain conduit 30 and the poison inlet 34 (as shown in FIG. 2) for discharging the pressurized drained poison solution 14b therein.

Accordingly, the method using the pump 50 further includes providing the gas 56 as a jet having kinetic energy, mixing the gas 56 with the drained poison solution 14a, and diffusing the mixed gas and drained poison solution 14b for decreasing the velocity thereof and increasing the static pressure thereof for forming the pressurized drained poison solution 14b therefrom.

Referring again to FIG. 2, the pump 50 is in the form of a conventional steam injector, and the gas 56 is a portion of the pressurizing fluid, or steam, 20. In this embodiment, the pressurizing means 48 further includes a supply conduit 70 joined in flow communication between the nozzle inlet 54 of the pump 50 and the steam conduit 22 between the steam valve 26 and the tank inlet 24 in parallel flow with the holding tank 12. In this way, when the steam valve 26 is open, a portion of the steam 16 is channeled through the steam conduit 22 to the tank inlet 24 as the pressurizing fluid 20, and another portion of the steam 16 is channeled from the valve 26 through the supply conduit 70 to the nozzle inlet 54 for providing the pressurized gas, or steam, 56 from the nozzle outlet 58.

Accordingly, the steam 16 from the vessel 102 may be used in the embodiment illustrated in FIG. 2 for both pressurizing the poison solution 14 in the holding tank 12 to the steam pressure $P_s$, and providing the kinetic energy in the pump 50 for further increasing the pressure of the poison solution 14 for increasing its flow rate into the vessel 102. The poison solution 14 may then be channeled into the vessel 102 by both the force of gravity and by the additional driving pressure provided by the kinetic energy conversion in the pump 50.

As shown in FIGS. 2 and 3, the initial pressure $P_1$ is that pressure at the upper surface of the poison solution 14 in the tank 12. The second pressure $P_2$ is the pressure in the holding tank 12 above the poison solution 14 when the steam valve 26 is opened, and is equal to the steam pressure $P_s$. Note also that the poison solution 14 being drained from the tank 12 when the drain valve 40 is open will also be at the second pressure $P_2$, including the additional pressure due to its pressure head or its distance below the top level of the poison solution 14 in the tank 12. And, the third pressure $P_3$ is the pressure of the poison solution as it is discharged from the pump 50, and includes a component due to the steam pressure $P_s$ plus the differential increase due to the pump 50, and the component due to the pressure head of the poison solution 14.

Figure 4:
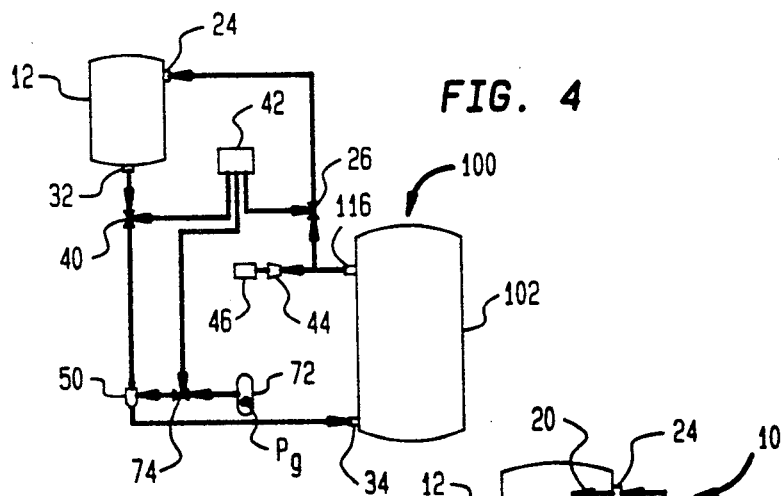
FIG. 4 is a schematic representation of a reactivity control system in accordance with another embodiment of the present invention.

Illustrated in FIG. 4 is the reactivity control system 10 in accordance with an alternate embodiment of the present invention. In this embodiment, the pressurizing gas 56 provided to the pump 50 (referring also to FIG. 3) is not a portion of the steam 16 from the vessel 102 as in the embodiment illustrated in FIG. 2, but is, instead, a conventional inert gas such as nitrogen ($N_2$) which is stored in a conventional accumulator 72 and is maintained at a gas pressure $P_g$ which is greater than the steam pressure $P_s$. A conventional explosive gas valve 74 is disposed in flow communication between the nozzle inlet 54 and the accumulator 72 and is normally closed for preventing gas flow therebetween. The controller 42 is effective also for opening the gas valve 74 upon opening of the steam valve 26 and the drain valve 40 to allow flow of the pressurized gas 56 from the accumulator 72 to the nozzle inlet 54. The gas pressure $P_g$ in the accumulator 72 is preferably substantially greater than the steam pressure $P_s$ for draining completely the poison solution 14 from the tank 12 and into the vessel 102. For example, the gas pressure $P_g$ may be between about 2,000 and 3,000 psi (13.8–20.7 MPa).

Although it is generally undesirable as disclosed above to have a high pressure vessel in the containment building, the accumulator 72 may be a relatively small tank at a relatively high pressure as compared to the holding tank 12 which is a relatively large tank, which, if maintained at a pressure greater than the steam pressure $P_s$ would require more precautions for maintaining the safe storage thereof. Accordingly, the relatively small high pressure accumulator 72 is preferred over a relatively large holding tank, such as tank 12, maintained continuously at a high pressure in accordance with conventional practice. In the embodiment illustrated in FIG. 4, the gas-jet pump 50, or alternatively referred to as a gas eductor, is used to produce the differential pressure increase of the poison solution to provide the required flow rate thereof into the vessel 102. And, in the embodiment of the invention illustrated in FIG. 2, the gas-jet pump 50, or alternatively referred to as a steam injector, provides the differential pressure increase of the poison solution 14 for obtaining the required flow rate thereof into the vessel 102. In both embodiments, the tank 12 is pressurized by admitting the steam 16 from the reactor vessel 102 through the explosive steam valve 26.

Figure 6:
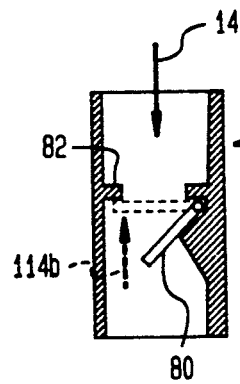
FIG. 6 is a longitudinal sectional schematic view of a check valve used in the reactivity control system illustrated in FIG. 5.
Figure 5:
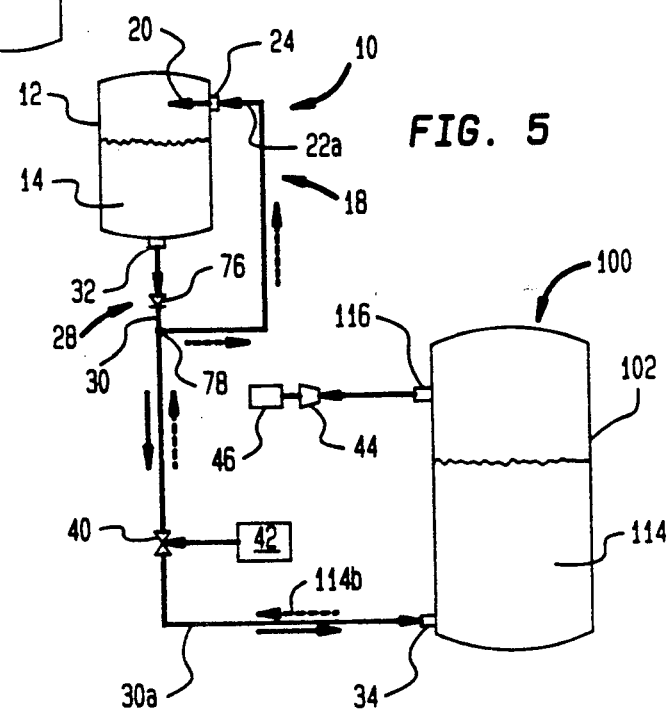
FIG. 5 is a schematic representation of a reactivity control system in accordance with another embodiment of the present invention.

Illustrated in FIGS. 5 and 6 is the reactivity control system 10 in accordance with another embodiment of the present invention. In this embodiment, the pressurizing fluid 20 channeled to the holding tank 12 is a portion of the water 114 contained in the vessel 102. The poison solution channeling means 28 further includes the drain conduit 30 disposed in flow communication between the tank 12 and the drain valve 40, and a conventional check valve 76 disposed in series flow communication in the drain conduit 30 between the holding tank 12 and the drain valve 40.

The pressurizing fluid channeling means 18 further includes a pressurizing conduit 22a disposed in flow communication between the tank 12 at its inlet 24 and the drain conduit 30 at a flow junction 78 between the check valve 76 and the drain valve 40. In the embodiment of the invention illustrated in FIG. 2, the steam conduit 22 and the drain conduit 30 are separate flow conduits. However, in the embodiment of the invention illustrated in FIG. 5, the drain conduit 30 between the flow junction 78 and the vessel 102 at the inlet 34 is a common flow conduit for both the pressurizing fluid channeling means 18 and the poison solution channeling means 28. Similarly, although two valves, i.e., valves 26 and 40 are used in the FIG. 2 embodiment, the pressurizing valve 26 is a common valve with the drain valve 40, i.e., the same valve, for performing both functions as described below.

More specifically, the controller 42 is effective for exploding open the drain valve 40 when desired for allowing the water 114 to flow through the common drain conduit 30a, the drain valve 40, the flow junction 78, the pressurizing conduit 22a, and through the inlet 24 into the holding tank 12 for pressurizing the poison solution 14 with the water 114 to a pressure equal to the steam pressure $P_s$, minus the relatively small pressure due to the pressure head of the water due to the difference in elevation between the tank 12 and the vessel 102. The flow of the water 114 upon opening of the drain valve 40 is shown in dashed line designated 114b from the vessel 102 to the tank 12. The check valve 76, illustrated in more particularity in FIG. 6, includes a pivotable valve flap 80 which is forced closed against a valve seat 82, as shown in dashed line, by the water flow 114b for preventing flow of the water 114b through the check valve 76 and into the holding tank 12 through its outlet 32. The holding tank 12 is initially maintained at atmospheric pressure and after the pressure therein is raised to the steam pressure $P_s$ by the pressurizing fluid 20 (or water 114b) the poison solution 14 will then drain by gravity from the tank 12 through the drain conduit 30 opening the check valve 76 (as shown in solid line in FIG. 6), through the common drain conduit 30a and into the reactor vessel 102.

In yet an alternate embodiment of the present invention, the check valve 76 and the pressurizing conduit 22a illustrated in FIG. 5 need not be used, and the backflow of water 114b through the valve 40 when it is initially opened is simply channeled through the drain conduit 30 and into the tank 12 initially through the drain outlet 32 until the pressure in the tank 12 equalizes to the steam pressure $P_s$. After which time the poison solution 14b will then simply flow through the outlet 32 by gravity, and through the drain conduit 30 and 30a to the vessel 102.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

1. A method of controlling nuclear reactivity in a nuclear reactor vessel having a reactor core for boiling water to produce steam in said vessel at a steam pressure comprising:
   maintaining a nuclear poison solution in a holding tank at an initial poison pressure less than said steam pressure during operation of said reactor core;
   channeling a pressurizing fluid into said holding tank for pressurizing said poison solution to a second poison pressure greater than said initial poison pressure for allowing gravity to drain said pressurized poison solution;
   draining by gravity pressurized said poison solution from said holding tank; and
   channeling said drained poison solution into said reactor vessel for mixing with said water to reduce reactivity in said core.

2. A method according to claim 1 further comprising:
   pressurizing said drained poison solution to a third poison pressure greater than said steam pressure; and
   said pressurized drained poison solution being channeled into said reactor vessel for mixing with said water to reduce reactivity in said core.

3. A method according to claim 2 wherein said drain poison solution pressurizing step comprises:
   providing a gas as a jet having kinetic energy;
   mixing said gas jet with said drained poison solution; and
   diffusing said mixed gas and drained poison solution for decreasing velocity thereof and increasing pressure thereof for forming said pressurized drained poison solution therefrom.

4. A method according to claim 3 wherein said pressurizing fluid is a portion of said steam channeled from said reactor vessel, and said gas is a portion of said pressurizing fluid.

5. A method according to claim 3 wherein said gas is provided from an accumulator maintained at a pressure greater than said steam pressure effective for draining completely said poison solution from said holding tank and into said reactor vessel.

6. A method according to claim 3 wherein said pressurizing fluid channeling step and said drained poison solution channeling step use separate flow conduits.

7. A method according to claim 1 wherein said pressurizing fluid channeling step and said drained poison solution channeling step use a common flow conduit to and from said reactor vessel.

8. A method according to claim 7 wherein:
   said common flow conduit extends to a check valve from an inlet at a bottom of said reactor vessel disposed in flow communication with said water, said water being said pressurizing fluid;
   a drain conduit extends from said check valve to the bottom of said holding tank for draining said poison solution;
   a pressurizing conduit extends from said check valve to the top of said holding tank for pressurizing said poison solution; and
   said check valve allows said pressurizing fluid to be channeled through said pressurizing conduit to pressurize said poison solution in said holding tank while preventing said pressurizing fluid to be channeled through said drain conduit to said holding tank bottom until said poison solution second pressure equals said steam pressure, at which time, said check valve allows said poison solution to drain through said drain conduit and said check valve to said common flow conduit and into said reactor vessel through said inlet.

9. A system for controlling nuclear reactivity in a nuclear reactor vessel having a reactor core for boiling water to produce steam in said vessel at a steam pressure comprising:
   a holding tank containing a nuclear poison solution at an initial poison pressure less than said steam pressure;
   means for channeling a pressurizing fluid from said reactor vessel to said holding tank for pressurizing said poison solution to a second poison pressure greater than said initial poison pressure, and including a pressurizing valve being normally closed for preventing flow of said pressurizing fluid to said holding tank;
   means for channeling said poison solution from said holding tank by gravity into said reactor vessel for mixing with said water to reduce reactivity in said core, and including a drain valve being normally closed for preventing flow of said poison solution drained by gravity from said holding tank; and
   means for opening said pressurizing valve and said drain valve to allow flow of said pressurizing fluid to, and said drained poison from, said holding tank.

10. A reactivity control system according to claim 9 further comprising means for pressurizing said drained poison solution to a third poison pressure greater than said steam pressure.

11. A reactivity control system according to claim 10 wherein said drained poison solution pressurizing means comprises a gas-jet pump including:
   a nozzle having an inlet for receiving a pressurized gas, and an outlet for discharging said gas as a jet having kinetic energy;
   a mixer having an inlet for receiving said drained poison solution, said nozzle outlet being disposed inside said mixer for discharging said gas for mixing with said drained poison solution in said mixer; and
   a diffuser for diffusing said mixed gas and drained poison solution received from said mixer for decreasing velocity thereof and increasing pressure thereof for forming said pressurized drained poison solution therefrom, said pressurized drain poison solution being discharged from an outlet of said diffuser.

12. A reactivity control system according to claim 11 wherein:
   said pressurizing fluid channeling means further include a steam conduit disposed in flow communication between said holding tank and said reactor vessel, said pressurizing fluid is pressuring steam channel through said steam conduit and said pressurizing valve being disposed in series flow in said steam conduit;
   said poison solution channeling means further include a drain conduit disposed in flow communication between said holding tank and said reactor vessel, and said drain valve being disposed in series flow in said drain conduit; and
   said gas-jet pump being disposed in flow communication in said drain conduit, said mixer inlet being disposed in flow communication with said drain valve for receiving said drained poison solution therefrom, and said diffuser outlet being disposed in flow communication with said reactor vessel for discharging said pressurized drained poison solution thereto.

13. A reactivity control system according to claim 12 wherein said nozzle inlet is disposed in flow communication with said pressurizing valve in parallel flow with said holding tank, and said gas is a portion of said pressurizing steam.

14. A reactivity control system according to claim 12 further comprising:
   an accumulator containing said gas maintained at a pressure greater than said steam pressure;
   a gas valve disposed in flow communication between said nozzle inlet and said accumulator and being normally closed for preventing gas flow therebetween; and
   said opening means being effective also for opening said gas valve upon opening of said pressurizing and drain valves to allow flow of said gas from said accumulator to said nozzle inlet.

15. A reactivity control system according to claim 14 wherein said gas is maintained in said accumulator at a pressure greater than said steam pressure effective for draining completely said poison solution from said holding tank and into said reactor vessel.

16. A reactivity control system according to claim 12 wherein said initial poison pressure is atmospheric pressure.

17. A reactivity control system according to claim 9 wherein:
   said pressurizing fluid is a portion of said water contained in said reactor vessel;
   said poison solution channeling means further include a drain conduit disposed in flow communication between said holding tank and said drain valve, and a check valve disposed in series flow communication in said drain conduit between said holding tank and said drain valve;
   said pressurizing fluid channeling means further include a pressurizing conduit disposed in flow communication between said holding tank and said drain conduit at a flow junction between said check valve and said drain valve;
   said drain conduit between said flow junction and said reactor vessel being a common flow conduit for both said pressurizing fluid channeling means and said poison solution channeling means;
   said pressurizing valve being a common valve with said drain valve; and
   said opening means being effective for opening said drain valve for allowing said water from said reactor vessel to flow through said drain conduit, said drain valve, said flow junction, and said pressurizing conduit to said holding tank for pressurizing said poison solution to a pressure equal to said steam pressure, said check valve being closed by said water for preventing flow of said water therefrom to said holding tank, after which time said poison solution will drain by gravity from said holding tank, through said drain conduit opening said check valve, and into said reactor vessel.

* * * * *